(12) United States Patent
Kohlruss et al.

(10) Patent No.: US 7,266,856 B2
(45) Date of Patent: Sep. 11, 2007

(54) FABRIC-STRIP CURTAIN FOR CAR WASH INSTALLATIONS

(76) Inventors: Gregor Kohlruss, Pater-Eugen-Breitensteinstrasse 1, 46325 Borken (DE); Hubert Wiesner, Grüner Weg 21, 46354 Südlohn (DE); Oliver Griebe, Heideweg 12, 46414 Rhede (DE)

( * ) Notice: Subject to any disclaimer, the term of this patent is extended or adjusted under 35 U.S.C. 154(b) by 271 days.

(21) Appl. No.: 10/475,035

(22) PCT Filed: Apr. 5, 2002

(86) PCT No.: PCT/EP02/03783

§ 371 (c)(1), (2), (4) Date: Apr. 21, 2004

(87) PCT Pub. No.: WO02/083469

PCT Pub. Date: Oct. 24, 2002

(65) Prior Publication Data

US 2004/0168273 A1    Sep. 2, 2004

(30) Foreign Application Priority Data

Apr. 17, 2001    (DE)    ............................ 201 06 593 U

(51) Int. Cl.
*B06S 3/04*    (2006.01)
(52) U.S. Cl. ................ 15/97.3; 15/230.16; 15/230.19
(58) Field of Classification Search ................ 15/97.3, 15/230.16, 230.19; 160/184, 332
See application file for complete search history.

(56) References Cited

U.S. PATENT DOCUMENTS

| | | | | |
|---|---|---|---|---|
| 4,515,202 A | * | 5/1985 | Wilson | ........................ 160/332 |
| 4,756,040 A | * | 7/1988 | Sereny | ........................ 15/97.3 |
| 5,410,770 A | | 5/1995 | Nittoli | |
| 5,584,090 A | | 12/1996 | Ennis | |

FOREIGN PATENT DOCUMENTS

| | | |
|---|---|---|
| DE | 3632554 | 4/1988 |
| DE | 298 16 045 | 1/2000 |
| EP | 0 787446 | 8/1997 |

* cited by examiner

*Primary Examiner*—Mark Spisich
(74) *Attorney, Agent, or Firm*—Collard & Roe

(57) ABSTRACT

The invention relates to a fabric-strip curtain for car wash installations, comprising a support bar (2) that is displace back and forth, on which cleaning strips (3) consisting of a cleaning textile are hung next to one another, each of the strips being provided with loops (5), which encompass the support bar (2) and are formed by fixing strips (6) that lengthen the top of the cleaning strips (4). The aim of the invention is to be able to replace each individual cleaning stip independently of the other neighbouring strips arranged on the support bar in a fabric-strip curtain of this type. To achieve this, one end of the fixing strip (6) is permanently fixed to the cleaning strip (4) and the opposite end is provided with a fixing element (8) for detachably attaching to the fixing strip (6) above the area (7) that is fixed to the cleaning strip (4).

5 Claims, 2 Drawing Sheets

FABRIC-STRIP CURTAIN FOR CAR WASH INSTALLATIONS

CROSS REFERENCE TO RELATED APPLICATIONS

Figure 1:
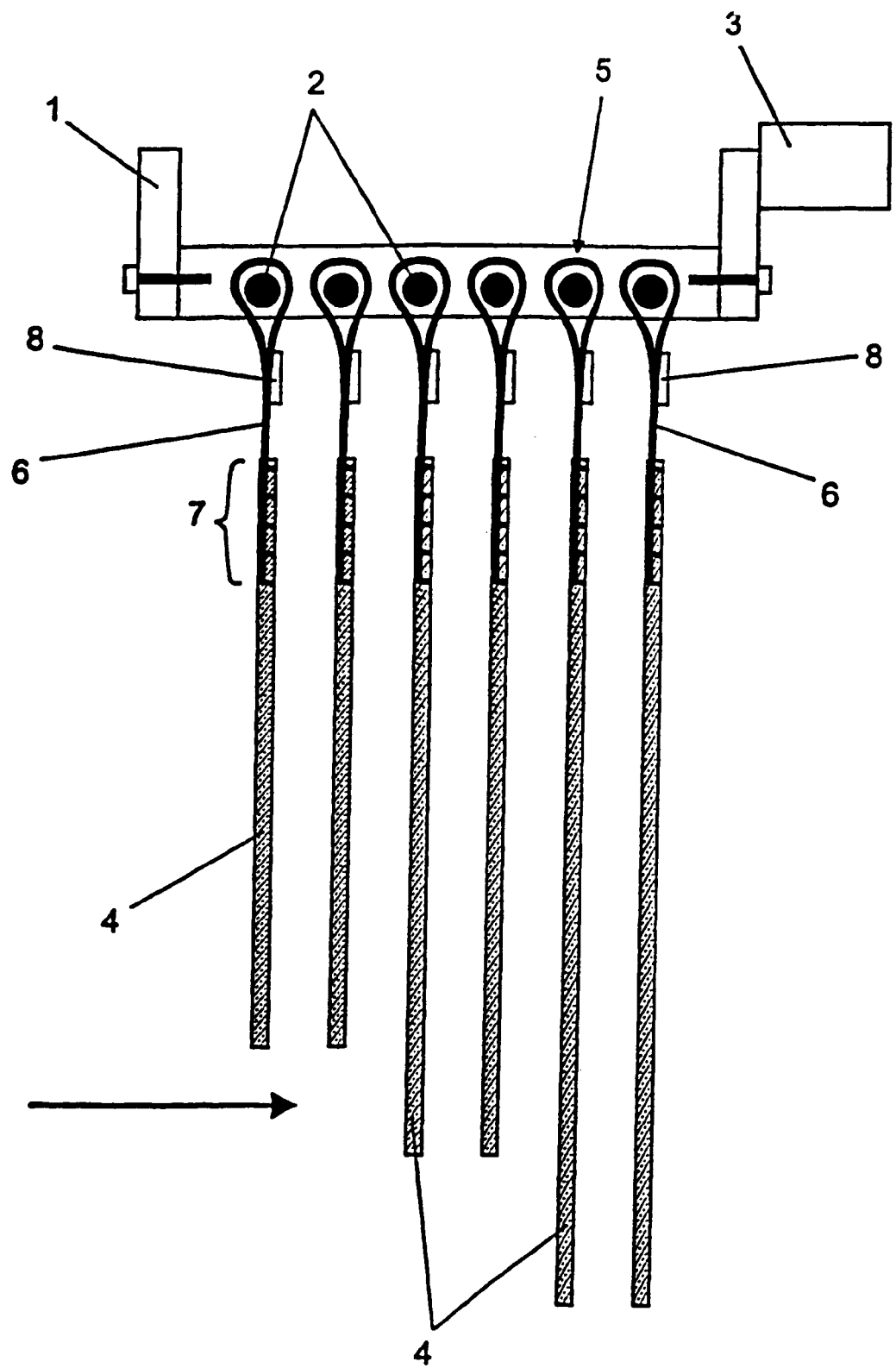

Applicants claim priority under 35 U.S.C. 119 of GERMANY Application No. 20106593.2 filed on Apr. 17, 2001. Applicants also claim priority under 35 U.S.C. §365 of PCT/EP02/03783 filed on Apr. 5, 2002. The international application under PCT article 21(2) was not published in English.

The invention relates to a fabric-strip curtain for car wash installations, comprising a support bar that is displaced back and forth, on which cleaning strips consisting of a cleaning textile are hung next to one another, each of said strips being provided with loops, which encompass the support bar and are formed by attachment strips that extend the top of the cleaning strip.

A brushless washing installation for vehicles is known from DE 36 32 554 A1, for example, in which such fabric-strip curtains are used both for washing and for drying. While the vehicle is being towed through the washing installation, it first passes through a so-called cloth washing station, in which wet cleaning of the vehicle takes place, using water with an additive of detergent substances. The cloth washing station has a plurality of cleaning strips made of a fabric material, which are hung, next to one another, on a support bar. The support bar is an integral part of a framework arranged above the vehicle to be cleaned, which is excited to move back and forth, by means of a suitable drive. In this connection, mechanical cleaning work is performed on the surfaces of the vehicle to be cleaned, by means of the fabric strips, whereby water and various detergent substances are applied to loosen and remove the adhering dirt, either by way of the cleaning strips or in another manner. At the end of the cleaning process, the vehicle passes through a drying station, which consists of a blower dryer and another fabric-strip curtain. The cleaning strips of this fabric-strip curtain that is intended for drying consist of a particularly absorbent material, so that water adhering to the vehicle after the washing process can be removed as completely as possible, in interaction with the blower dryer.

In the case of both the fabric-strip curtain used for washing and the fabric-strip curtain used for drying, the cleaning strips are usually attached to the support bars by means of loops sewn on at the top. Because of the washing and drying operations, the cleaning strips are subjected to great mechanical stress. Accordingly, the strips wear out regularly, and must be replaced. In the case of the usual cleaning strips provided with sewn-on loops, it is disadvantageous that they-can only be threaded onto the support bar from one side. Therefore it is practically impossible to replace individual strips of the fabric-strip curtain, without having to remove the other strips, arranged next to them, as well.

Proceeding from this, the invention is based on the task of making available a fabric-strip curtain in which each individual cleaning strip can be replaced independent of the other strips arranged on the support bar, next to it. The attachment of the cleaning strip on the support bar is supposed to be particularly simple and, at the same time, it is supposed to be possible to produce the cleaning strip, with the related attachment strip, with little effort and at low cost.

This task is accomplished, proceeding from a fabric-strip curtain of the type stated initially, in that one end of the attachment strip is permanently attached to the cleaning strip, and the opposite, free end is provided with an attachment element for detachably affixing it to the attachment strip above the area that is attached to the cleaning strip.

In contrast to the previously known fabric-strip curtains, the cleaning strips do not have any firmly sewn-on loops in the case of the curtain according to the invention. Instead, an attachment element is provided on the attachment strip that extends the cleaning strip towards the top, by means of which element the loop can be opened, so that each cleaning strip can be removed or hung individually, independent of the strips arranged next to it on the support bar. The loop that encompasses the support bar is formed in that the free end of the attachment strip is detachably fixed in place on the attachment strip by means of the attachment element, specifically being attached directly above the area in which the cleaning strip is attached to the attachment strip.

It is possible, in advantageous manner, in the case of existing fabric-strip curtains, to replace the cleaning strips hung in conventional manner, as needed, with strips configured according to the invention. For this purpose, the attachment strip that encompasses the support bar in loop shape is simply cut through, so that the worn-out cleaning strip can be removed. Afterwards, a new cleaning strip according to the invention is hung on the support bar, in that the attachment strip is laid around the support bar, whereby a loop that encompasses the support bar is formed, which is secured in that the free end of the attachment strip is fixed in place on the attachment strip, above the attachment area of the cleaning strip, by means of the attachment element.

An advantageous further development of the fabric-strip curtain according to the invention results if the attachment element is configured as a cross-stay, which is connected with the side edges of the attachment strip in such a manner that a narrow passage for the cleaning strip to pass through is left between the cross-stay and the attachment strip. When hanging the cleaning strip onto the support bar, the bottom, free end of the cleaning strip is passed through the narrow passage formed by the cross-stay connected with the side edges of the attachment strip. In this manner, a loop is formed, which is drawn closed in that the entire cleaning strip is drawn through the slit between the cross-stay and the attachment strip. Such an attachment element is particularly robust and is characterized by simple handling during hanging of the cleaning strips on the support bar and their removal from it.

Particularly simple and cost-effective production of the fabric-strip curtain according to the invention results if the attachment strip and the cross-stay, just like the cleaning strip, consist of fabric material and are connected with one another by means of seams. In this case, it is possible to produce the attachment strip, together with the attachment element configured as a cross-stay, from a single cut piece. The functionality according to the invention is then achieved by making suitable seams. It is possible, in advantageous manner, to affix cleaning strips made of different materials, depending on the purpose of use, to the attachment strip. Possible materials are absorbent nonwoven fabrics, fur-like materials, foam, leather, and synthetic leather.

It is practical if the attachment strip consists of a stiff fabric material and is provided with lateral catch throats in the fixing area of the cross-stay, above the attachment area of the cleaning strip, in which throats the cross-stay can be engaged in the fixing position. In this manner, a fixed, predetermined circumference of the loop that encompasses the support bar is obtained, which has the result, in advantageous manner, that all of the cleaning strips hung next to one another have the same length. By using a stiff fabric material for the attachment strip, it is ensured, together with the engagement of the cross-stays in the lateral catch throats of the attachment strip, that the attachment strips are securely fixed in place on the support bar, and that they cannot come loose, by themselves, during operation of the car wash installation.

With regard to simple and cost-effective production, it is advantageous if the attachment strip and the cross-stay consist of an interconnected fabric cut-out, whereby the cross-stay is formed by an edge of the fabric cut-out that has been folded in, which edge is partly separated from the cut-out by means of a slit that runs crosswise and extends over part of the width of the cut-out. Therefore, only a single fabric cut-out for the attachment strip and the attachment element affixed to it is needed. The slit that extends over part of the width of the cut-out forms the passage for the cleaning strip to pass through, whereby a detachable loop around the support bar is formed, according to the invention.

It is practical to provide the fabric cut-out with markings for sewing on the cleaning strip. With this, an attachment strip that can be universally used is made available, which can be used for fabric-strip curtains having support bars of various thickness and cleaning strips of different lengths.

Figure 2:
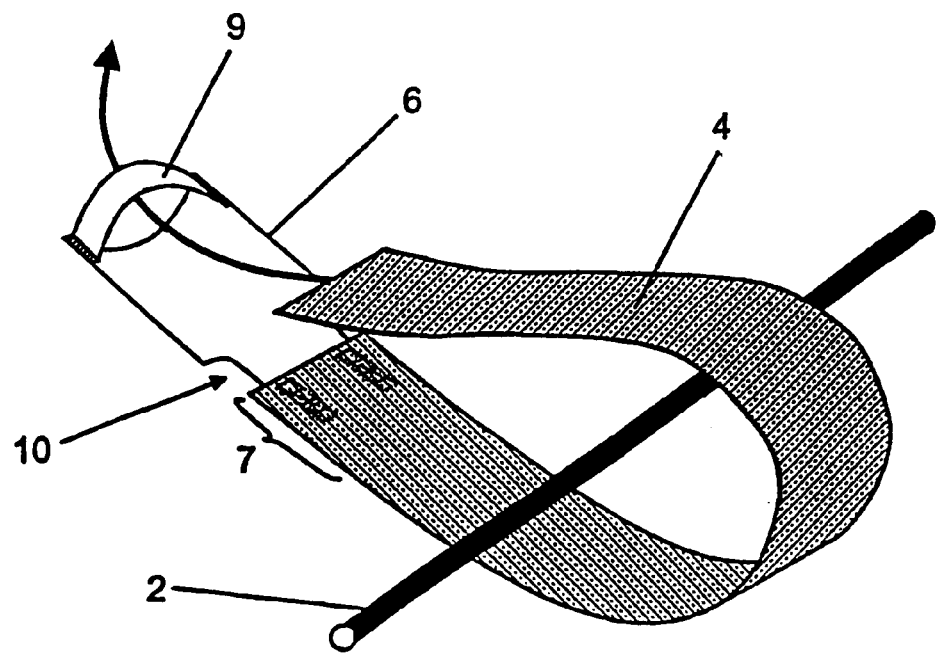
Figures 3, 4:
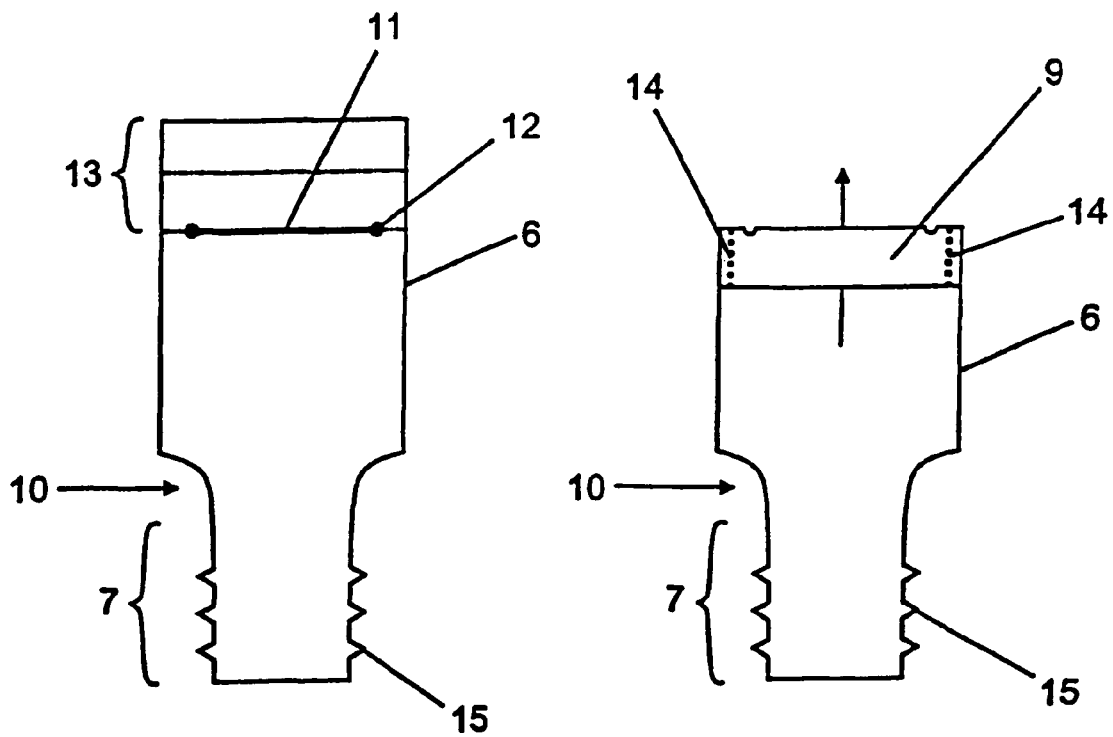

Exemplary embodiments of the invention will be explained in greater detail in the following, using the figures. These show:

FIG. 1 a side view of the fabric-strip curtain according to the invention;

FIG. 2 a perspective view of a cleaning strip with an attachment element according to the invention;

FIG. 3 a fabric cut-out for an attachment strip;

FIG. 4 a sewn fabric cut-out according to FIG. 3, with a passage opening for the cleaning strip.

FIG. 1 shows a fabric-strip curtain for car wash installations according to the invention. The direction in which the vehicles are towed through the car wash installation is indicated by the arrow. Above the vehicles to be washed, a framework 1 is arranged, on which a plurality of support bars 2 that run crosswise to the towing direction are attached. The framework 1 and thereby the support bars 2 are excited to move back and forth by means of a drive 3. A plurality of cleaning strips 4 is hung on each support bar 2, next to one another. Loops 5 affixed at the top end of the cleaning strips, which encompass the support bar 2, in each instance, serve for this purpose. The loops are formed by attachment strips 6, which extend the cleaning strips 4 towards the top. For this purpose, the cleaning [sic] strips 6 are permanently sewn to the cleaning strips 4 in an attachment region 7. Each attachment strip 6 has an attachment element 8, with which the free end of the attachment strip 6 is detachably affixed above the attachment area 7 of the cleaning strip 4. In this way, the loops 5 are formed, which encompass the support bar 2 and which can be opened at any time, because of the detachable attachment, in order to be able to remove and replace individual cleaning strips.

The cleaning strip 4 shown in FIG. 2 is permanently sewn to the attachment strip 6 in the attachment area 7. The attachment element, configured as a cross-stay 9, is arranged at the free end of the attachment strip 6. The cross-stay 9 is sewn to the side edges of the attachment strip 6, in such a manner that a passage for passing the cleaning strip 4 through remains between the cross-stay 9 and the attachment strip 6. In order to affix the cleaning strip 4 on a support bar 2, the cleaning strip 4 is laid around it, and the free end of the cleaning strip 4 is then passed through the slit between the attachment strip 6 and the cross-stay 9. The loop that is formed in this manner is drawn closed by further pulling on the free end of the cleaning strip 4, whereupon the cross-stay 9 finally engages in catch throats 10 on the attachment strip 6 with its attachment area. In this way, the fixed position of the cleaning strip 4 on the support bar 2 is defined.

FIG. 3 shows a fabric cut-out for an attachment strip 6 according to the invention. In the top area of the cut-out, a slit 11 that runs crosswise is arranged, which ends in circular punched holes 12 at the sides, which guarantee protection against a lateral tear. The top edge 13 of the attachment strip 6, which is located above the slit 11, is folded down twice, so that it forms the cross-stay 9 that serves as the attachment element (see FIG. 2). Two seams 14 are made in the side edges of the folded-down edge, by means of which seams the cross-stay 9 is connected with the attachment strip 6, as shown in FIG. 4. A narrow passage is formed between the attachment strip and the cross-stay 9, through which the cleaning strip 4 is drawn, as indicated by the arrow. In the attachment area 7 of the cleaning strip, the fabric cut-out shown in FIGS. 3 and 4 has markings 15 for sewing on the cleaning strip in different positions.

The invention claimed is:

1. A fabric-strip curtain for car wash installations comprising:
    (a) a reciprocating support bar;
    (b) a plurality of cleaning strips comprising a cleaning textile suspended on said support bar next to one another; and
    (c) a plurality of loops provided on said cleaning strips, each loop embracing said support bar and formed by an attachment strip extending a respective one of said cleaning strips upwardly, each attachment strip having a first end permanently attached to the cleaning strip and a second opposite free end comprising an attachment element for releasable securing to the attachment strip above an attachment area of the cleaning strip;
    wherein the attachment element comprises a cross-stay connected to side edges of the attachment strip so that a narrow passage for the cleaning strip to pass through remains between the cross-stay and the attachment strip.

2. The fabric-strip curtain according to claim 1, wherein the attachment strip and the cross-stay comprise fabric material and are connected together by seams.

3. The fabric-strip curtain according to claim 1, wherein the attachment strip comprises a stiff fabric material and is provided with lateral catch throats in a fixing area of the cross-stay above the attachment area of the cleaning strip, the cross-stay being engagable in a fixing position into said throats.

4. The fabric-strip curtain according to claim 1, wherein the attachment strip and the cross-stay comprise an interconnected fabric cut-out having a width, wherein the cross-stay is formed by an inwardly folded-over edge of the fabric cut-out said edge being partly separated from the cut-out by a transversely extending slit extending over a part of the width of the cut-out.

5. The fabric-strip curtain according to claim 4, wherein the fabric cut-out is provided with markings for sewing on the cleaning strip.

* * * * *